(12) United States Patent
Clingman et al.

(10) Patent No.: US 7,516,680 B2
(45) Date of Patent: Apr. 14, 2009

(54) STRAIN ENERGY SHUTTLE APPARATUS AND METHOD

(75) Inventors: Dan J Clingman, Auburn, WA (US); Robert T Ruggeri, Kirkland, WA (US); W. Dean Clingman, Renton, WA (US)

(73) Assignee: The Boeing Company, Chicago, IL (US)

( * ) Notice: Subject to any disclaimer, the term of this patent is extended or adjusted under 35 U.S.C. 154(b) by 831 days.

(21) Appl. No.: 10/909,784

(22) Filed: Jul. 30, 2004

(65) Prior Publication Data

US 2005/0022619 A1 Feb. 3, 2005

Related U.S. Application Data

(60) Provisional application No. 60/491,075, filed on Jul. 30, 2003.

(51) Int. Cl.
*F16H 21/22* (2006.01)
*E05F 1/08* (2006.01)

(52) U.S. Cl. .................. 74/44; 74/51; 16/281; 267/150

(58) Field of Classification Search ..................... 16/64, 16/65, 79, 80, 280, 281; 74/44, 45, 49, 51; 267/150, 250; 92/130 D
See application file for complete search history.

(56) References Cited

U.S. PATENT DOCUMENTS

| | | | | |
|---|---|---|---|---|
| 962,916 | A * | 6/1910 | Regan | 16/55 |
| 1,040,968 | A * | 10/1912 | Voight | 16/281 |
| 1,123,478 | A * | 1/1915 | Brucker | 16/281 |
| 1,627,113 | A * | 5/1927 | Pearson | 267/224 |
| 2,971,214 | A * | 2/1961 | Eckel et al. | 16/50 |
| 5,271,652 | A * | 12/1993 | Watanabe et al. | 296/36 |
| 5,440,969 | A * | 8/1995 | Shin | 92/68 |
| 6,065,934 | A | 5/2000 | Jacot et al. | |
| 6,155,531 | A * | 12/2000 | Holborow et al. | 251/30.02 |
| 6,499,952 | B1 | 12/2002 | Jacot et al. | |

\* cited by examiner

*Primary Examiner*—William C Joyce
(74) *Attorney, Agent, or Firm*—Harness, Dickey & Pierce, P.L.C.

(57) ABSTRACT

An apparatus and method for providing a torque to an external member to assist in twisting or deforming the external member. In one implementation the apparatus is useful for providing a force to a torque tube to assist in rotating, bending or twisting a wing, an airfoil, or a rotorcraft blade. The apparatus includes at least one biasing member which provides a biasing force to a linkage assembly, where the linkage assembly is pivotally coupled to a torque tube. The torque tube is fixedly coupled to the structure which needs to be bent, twisted or flexed. The energy stored in the biasing member provides the great majority of mechanical force required to rotate the torque tube and bend, twist or deform the structure when the structure is urged back into an unflexed or un-deformed state, the energy stored in the structure is transferred back to the apparatus. Thus, an actuator that would normally be employed for this purpose can be made much smaller, lighter and less expensive due to the significant mechanical energy provided by the apparatus.

9 Claims, 8 Drawing Sheets

STRAIN ENERGY SHUTTLE APPARATUS AND METHOD

CROSS-REFERENCE TO RELATED APPLICATIONS

This application claims the benefit of U.S. Provisional Application No. 60/491,075, filed on Jul. 30, 2003. The disclosure of the above application is incorporated herein by reference.

FIELD OF THE INVENTION

The present invention relates to systems for providing a torque to move an object that needs to be rotated, and more particularly to an energy shuttle apparatus and method that converts linear motion into a rotary motion for providing a torque to a component that is required to be rotated or twisted.

BACKGROUND OF THE INVENTION

The ability to controllably twist or bend a wing, airfoil or rotorcraft blade, during various phases of flight of an aircraft or rotorcraft, has been a goal of design engineers for some time. The ability to controllably twist or deform a wing, air foil, rotorcraft blade, etc. during various phases of flight can significantly enhance the performance of an aircraft or rotorcraft.

A major obstacle to implementing actuators or other devices that are designed to twist a wing of an aircraft, a blade of a rotorcraft, etc. is that the actuator or other device used for this purpose must overcome the inherent structural stiffness of the material used to form the wing or rotorcraft blade. This limitation has required that such actuators or other like devices be physically large in relation to the wing or rotorcraft blade which they are associated with, as well as expensive, and further require a significant degree of power to overcome the structural stiffness of the structure which needs to be twisted or flexed.

Accordingly, there still exists a need in the art for a relatively lightweight, compact apparatus capable of being integrated for use with an air foil, wing, rotorcraft blade, etc. that can twist or deform the air foil, wing or rotorcraft blade as needed, and which further does not require the use of large actuators.

SUMMARY OF THE INVENTION

The present invention is directed to a system and method for assisting in moving a component. More specifically, the invention relates to an apparatus and method for storing energy and "shuttling" the energy between the apparatus and an airfoil, wing or rotorcraft blade. In one preferred form the present invention is directed to an apparatus which assists in providing a torque to a member used to twist a structure such as a wing, air foil or rotorcraft blade. A biasing member is incorporated which is coupled to a linkage assembly. The linkage assembly is in turn operatively coupled to a member capable of imparting a twisting force to a structure associated with a wing, air foil or rotorcraft blade. The apparatus is assembled with the biasing member in a biased condition (i.e., pre-loaded) such that the apparatus stores sufficient energy to assist in twisting the airfoil, wing or blade, and more specifically to provide virtually the entire torque needed to twist or rotate the wing, airfoil or blade. The apparatus effectively provides a negative spring force to the structure which operates to overcome the inherent structural stiffness of the structure.

In one preferred implementation the member comprises a torque tube extended within at least a portion of a air foil, wing or rotorcraft blade. A conventional, low power actuator is used to initiate rotational movement of the torque tube and the biasing force stored by the biasing member provides at least a significant portion (or substantially all) of the force required to twist or deform the structure. In effect, the stored energy is transferred (i.e., "shuttled") to the airfoil, wing or blade to help twist the structure and then transferred back ("shuttled") to the biasing member when the structure is allowed to return to its unflexed or un-deformed state. This allows a much smaller, lighter weight and less costly actuator to be employed in such applications because the actuator is only required to supply a very small portion of the torque needed to bend or deform the structure with the stored energy in the biasing member being the predominant force used to twist the structure. The biasing member can be "tuned" so that substantially only the aerodynamic load experienced by the structure needs to be overcome by the actuator. The linkage assembly provides the further advantage of being able to rotate the torque tube in opposite rotational directions, which significantly enhances the range of bending or flexing action that can be imparted to the structure.

BRIEF DESCRIPTION OF THE DRAWINGS

The present invention will become more fully understood from the detailed description and the accompanying drawings, wherein:

FIG. 35 is a view of the apparatus shown in FIG. 1 but incorporating coil springs instead of Belleville washers.

DETAILED DESCRIPTION OF THE PREFERRED EMBODIMENTS

The following description of the preferred embodiment(s) is merely exemplary in nature and is in no way intended to limit the invention, its application, or uses.

Figure 1:
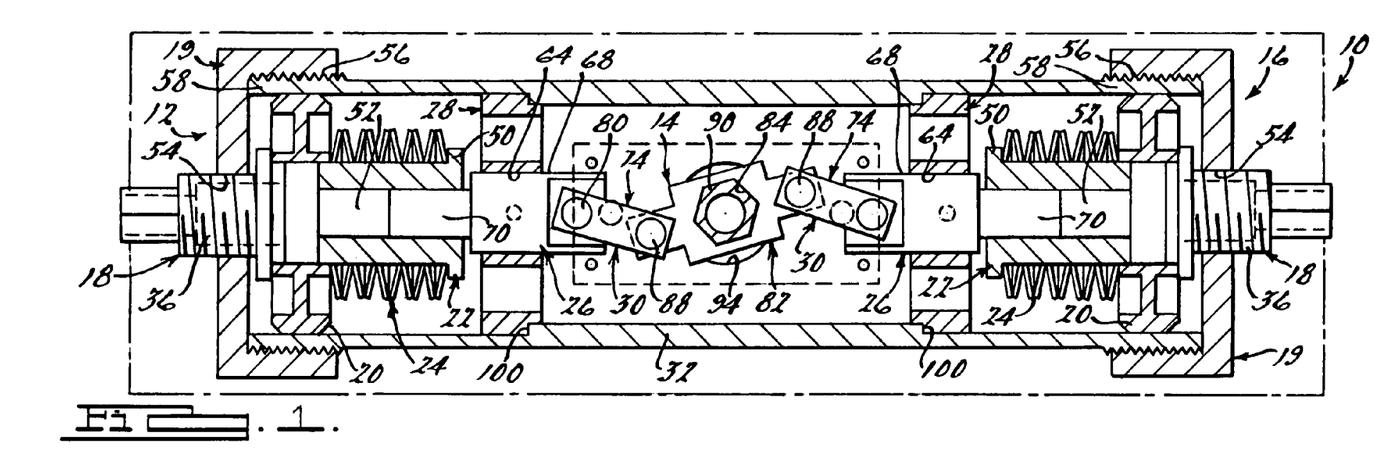
FIG. 1 is a side view of an apparatus in accordance with a preferred embodiment of the present invention.

Referring to FIG. 1, there is shown an apparatus 10 in accordance with a preferred embodiment of the present invention. The apparatus is useful for storing energy that can be "shuttled" between it and a structure such as a wing, airfoil, or rotorcraft blade to provide a twisting force (i.e., torque) to assist in twisting the wing, air foil, rotorcraft blade or any other structure requiring a bending or twisting force to be applied thereto. It is anticipated that the apparatus 10 will find significant utility in aircraft and aerospace applications where it is highly desirable to flex or twist a wing, air foil or rotorcraft blade during various phases of flight. However, the apparatus 10 may be adapted for use with virtually any structure that requires that its structural stiffness be overcome during twisting, bending or other movement thereof.

With reference to FIG. 1, the apparatus 10 generally includes a first assist assembly 12, a torque tube assembly 14, and a second assist assembly 16 which is identical in construction to the first assist assembly 12. However, it will be appreciated immediately that the present invention 10 can be implemented with only one of the assist assemblies 12 or 14 if desired, but will obviously provide only one-half of the torque that would be provided with both of the assist assemblies 12 and 16.

Since assist assemblies 12 and 16 are identical in construction, only the construction of assist assembly 12 will be described. Assist assembly 12 includes a tension adjuster 18, an end cap 19, an end guide 20, a spring guide 22, a biasing member or assembly 24, an end bearing 26, a center support 28 and a linkage assembly 30. Components 18-30, as well as the torque tube assembly 14, are disposed within a tubular housing 32. The housing 32 is supported within or adjacent the structure to be twisted or deformed, as will be explained in greater detail in the following paragraphs.

Figure 4:
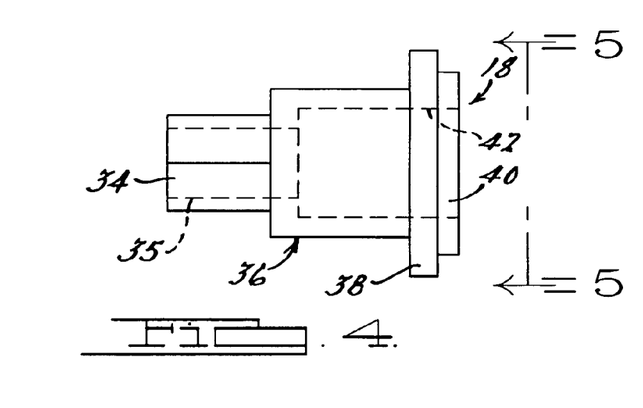
FIG. 4 is a side view of the tension adjuster.
Figure 5:
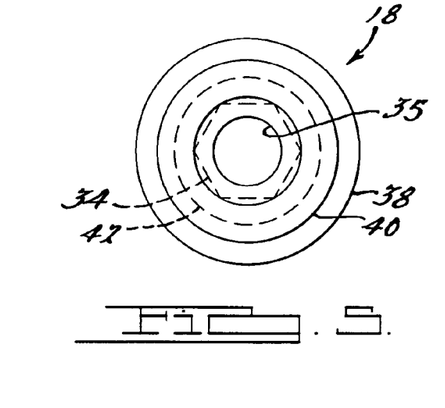
FIG. 5 is an end view of the tension adjuster taken in accordance with directional line 5-5 in FIG. 4.

Referring to FIGS. 1, 4 and 5, the tension adjuster is shown in greater detail. The tension adjuster includes a preferably hex shaped shaft 34 on which a suitable wrench can be used to rotate the tension adjuster 18. The shaft 34 has a bore 35. A main body 36 has a mid flange 38 and an inside flange 40. The main body 36 also includes an opening 42 that communicates with bore 35.

Figure 6:
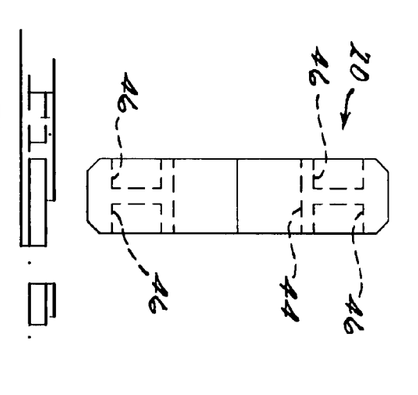
FIG. 6 is a side view of the end guide.
Figure 7:
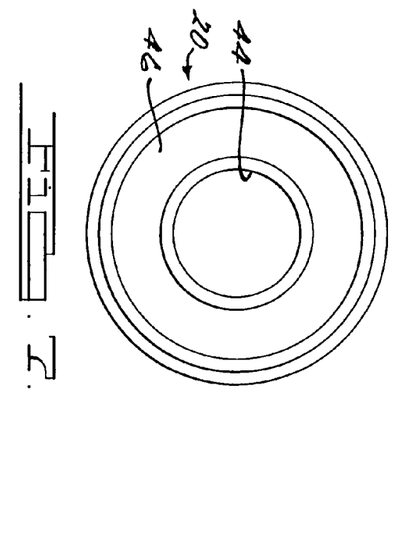
FIG. 7 is a front view of the end guide.
Figure 8:
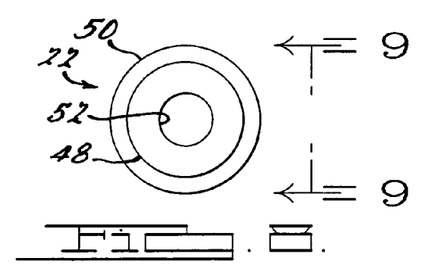
FIG. 8 is an end view of the spring guide.
Figure 9:
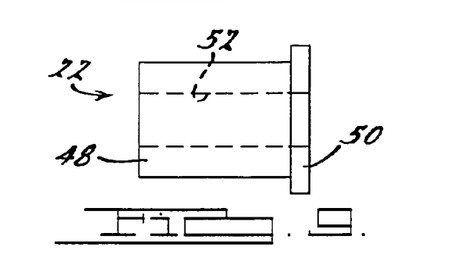
FIG. 9 is a side view of the spring guide taken in accordance with directional line 9-9 in FIG. 8.

Referring to FIGS. 1 and 6-7, the end guide 20 can be seen to include a bore 44. The end guide 20 further includes relief areas 46 for reducing weight. The end guide 20 fits over the outer surface of inside flange 40 of tension adjuster 18 such that the end guide 20 is supported on the inside flange.

Referring to FIGS. 1, 8-10, the spring guide 22 includes a body 48 having a flange 50 and a bore 52. A portion of the body 48 extends within the bore 44 of the end guide 20 and is free to slide therewithin linearly (i.e., horizontally) in the drawing of FIG. 1.

With further reference to FIG. 1, the biasing assembly 24 is illustrated as a plurality of Belleville washers stacked one against another. However, it will be appreciated that a coil spring 24' or other suitable biasing element could just as readily be incorporated, as shown in FIG. 35. The Belleville washers, however, are particularly advantageous in that they provide a non-linear spring rate. The biasing assembly 24 thus serves to exert a biasing force that tends to urge the spring guide 22 to the right in the drawing of FIG. 1.

Figure 10:
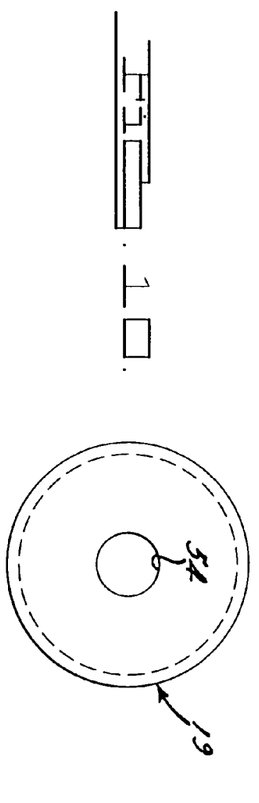
FIG. 10 is an end view of the end cap of FIG. 1.

Referring to FIGS. 1 and 10, the end cap 19 includes a threaded bore 54 and a threaded internal recess 56. The threaded internal recess 56 fits over a threaded outer end 58 of the housing 32 to affix the end cap 19 to an end of the housing 32. The threaded bore 54 receives the threaded main body 36 of the tension adjuster 18. The position of the tension adjuster 18 can thus be adjusted by rotating with a suitable tool the hex shaped shaft 34, which causes the end guide 20 to be urged over the spring guide 22 which compresses the biasing assembly 24. In this manner, the biasing force exerted against the flange 50 of the spring guide can be adjusted.

Figure 11:
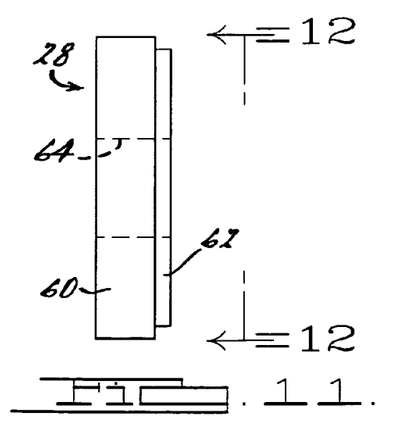
FIG. 11 is a side view of the center support.
Figure 12:
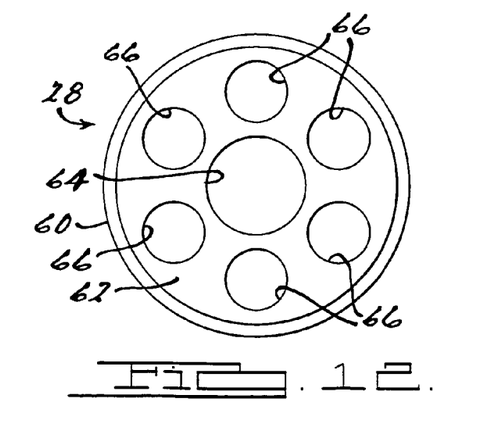
FIG. 12 is a front view of the center support taken in accordance with directional line 12-12 in FIG. 11.

Referring to FIGS. 11 and 12, the center support 28 can be seen to include a main body 60 having a protruding portion 62. A bore 64 extends through the main body 60 and portion 62. A plurality of holes 66 are preferably provided for weight reduction.

Figure 13:
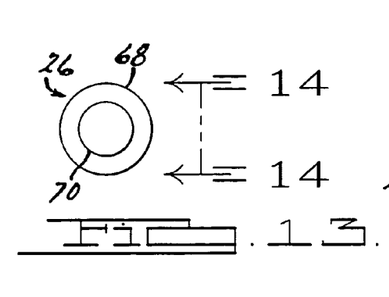
FIG. 13 is a front end view of the end bearing.
Figure 14:
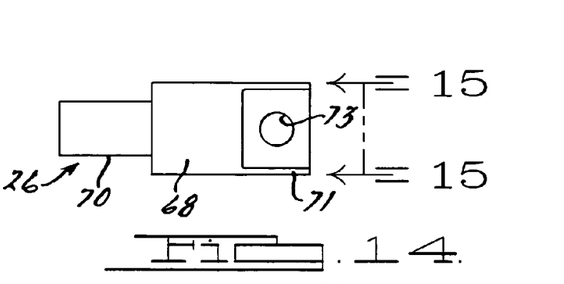
FIG. 14 is a side view of the end bearing taken in accordance with directional line 14-14 in FIG. 13.
Figure 15:
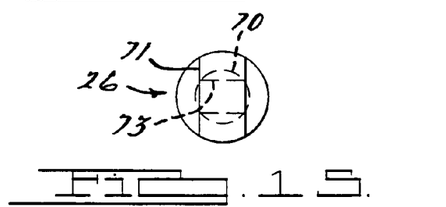
FIG. 15 is a rear end view of the end bearing taken in accordance with directional line 15-15 in FIG. 14.

Referring to FIGS. 13-15, the end bearing 26 can be seen. End bearing 26 includes a shaft 70 extending from a body 68. A mounting portion 71 having a bore 72 is also formed to extend from the body 68. A hole 73 extends through the mounting portion 71.

With further reference to FIGS. 1 and 13-15, the shaft 70 of the end bearing 26 extends into the bore 52 of the spring guide 22, while the body 68 extends within the bore 64 of the center support 28.

Figure 16:
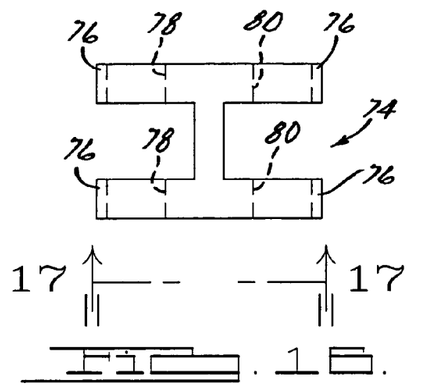
FIG. 16 is a plan view of the end link.
Figure 17:
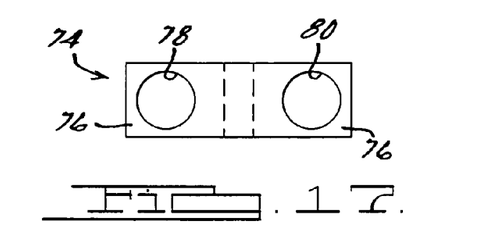
FIG. 17 is a side view of the end link taken in accordance with directional line 17-17 in FIG. 16.

Referring to FIGS. 16 and 17, an end link 74 associated with the linkage assembly 30 of FIG. 1 can be seen in greater detail. The end link 74 comprises an H-shaped component having arms 76 which include openings 78 and 80 formed therein. Openings 78 are aligned to receive a dowel pin 80 (FIG. 1) for coupling the end link 74 to the mounting portion 71 of the end bearing 26. Thus, the end link 76 is free to pivot about the mounting portion 71.

Figure 18:
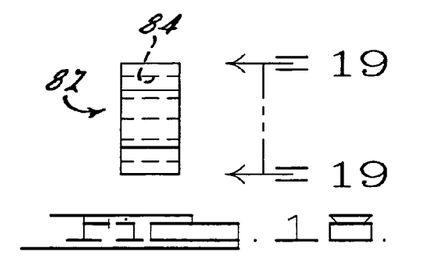
FIG. 18 is a side view of the center link.
Figure 19:
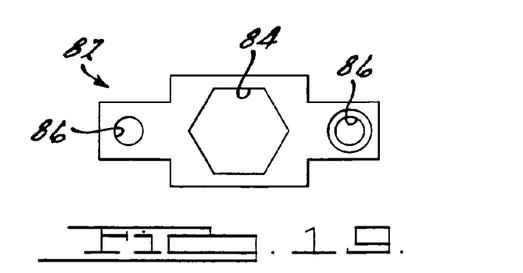
FIG. 19 is a plan view of the center link taken in accordance with directional line 19-19 in FIG. 18.

With reference to FIGS. 1, 18 and 19, a portion of the torque tube assembly 14 can be seen in the form of a center link 82. The center link 82 includes a hex-shaped opening 84 and a pair of bores 86 on opposite sides of the hex-shaped opening 84. One of the bores 86 fits between one pair of the arms 76 of the end link 74 and is held therein by a dowel pin 88 (FIG. 1) that extends through openings 80 (FIG. 16) to pivotally couple the center link 82 to the end link 74. The other bore 86 is identically coupled to the end 74 link of the second assist assembly 16.

Figures 20, 21:
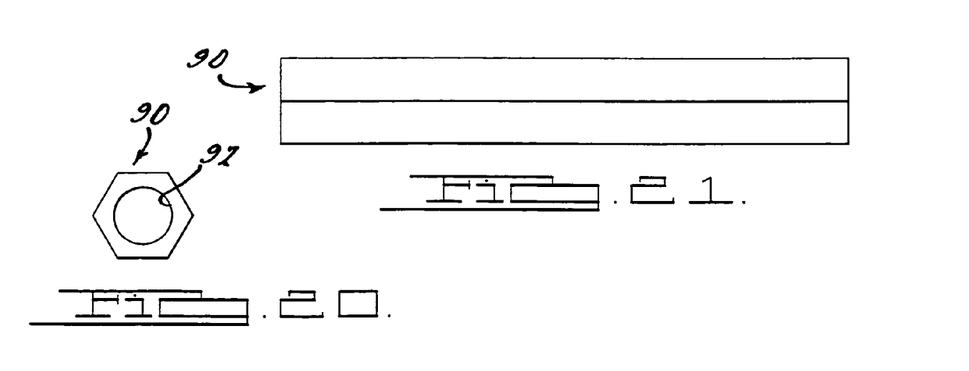
FIG. 20 is an end view of the torque tube.
FIG. 21 is a side view of the torque tube.

Referring to FIGS. 20 and 21, a torque tube 90 associated with the torque tube assembly 14 is shown. Torque tube 90 includes a hex-shaped outer surface and a bore 92 formed to reduce the weight of the torque tube 90. The torque tube 90 is slidably received within the hex-shaped opening 84 of the center link 82. Referring briefly to FIG. 1, the torque tube 90 also extends out through an opening 94 in the housing 32. Thus, the torque tube 94 extends normal to the direction of motion of the end bearing 26.

Figure 22:
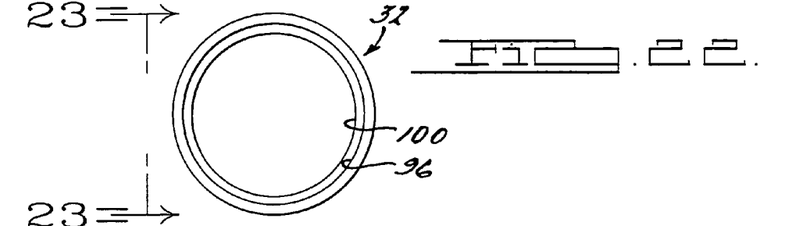
FIG. 22 is an end view of the housing.
Figure 23:
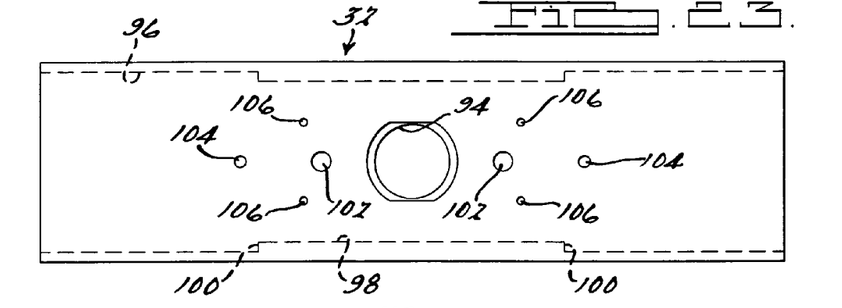
FIG. 23 is a side view of the housing taken in accordance with directional line 23-23 in FIG. 22.

Referring now to FIGS. 22 and 23, the housing 32 will be described in greater detail. In addition to the opening 94, the housing 32 includes an inner bore 96 extending entirely through its length with a reduced diameter section 98 along a mid portion thereof. Reduced diameter area 98 thus forms a pair of steps 100 internal to the housing 32. Each step 100 abuts one of the center supports 28 of the apparatus 10. End guide 20 (FIG. 1) is further dimensioned to fit within bore 96 so as to be able to move slideably within the bore 96. On opposite sides of the bore 94 are a pair of openings 102. Another pair of openings 104 are provided outside of openings 102. Still another plurality of bore openings 106 are provided about the opening 94. Openings 102, 104 and 106 all extend through to the back (i.e., hidden from view) side of housing 32 so as to allow fastening elements such as dowel pins or threaded fasteners to extend entirely through the housing 32.

Figure 24:
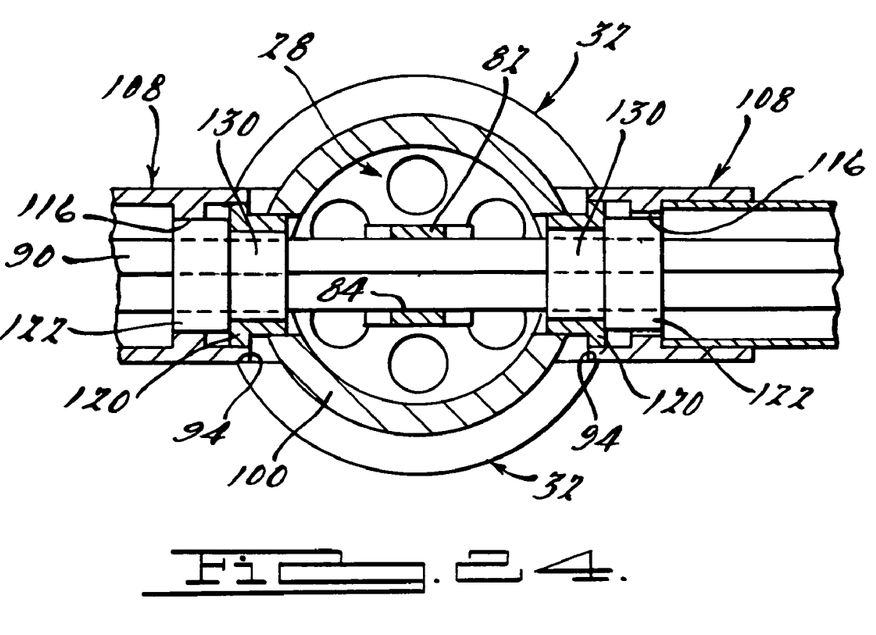
FIG. 24 is a cross-sectional side view of the end members secured to the housing.
Figure 25:
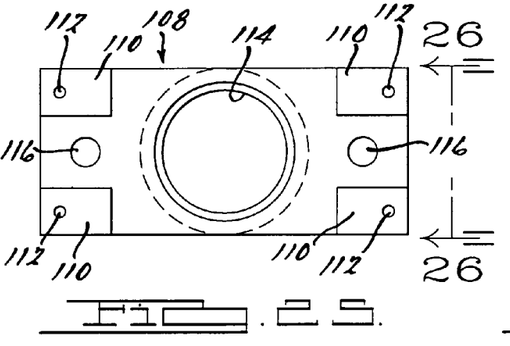
FIG. 25 is a plan view of one of the end members.
Figure 26:
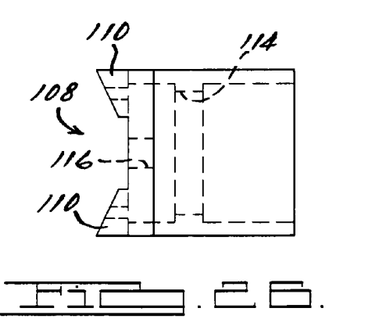
FIG. 26 is a side view of the end member of FIG. 25 taken in accordance with directional line 26-26 in FIG. 25.
Figure 27:
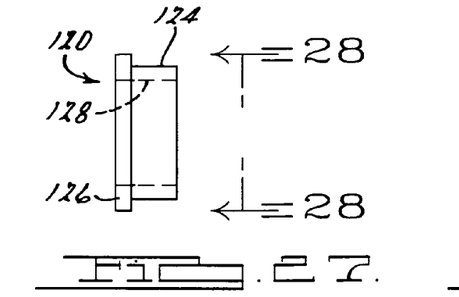
FIG. 27 is a side view of the outer bearing member.
Figure 28:
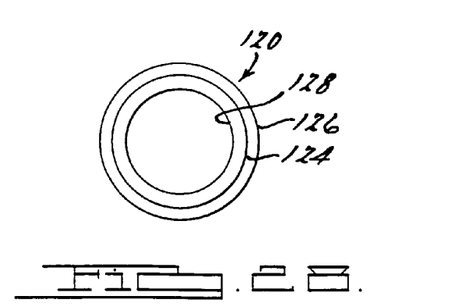
FIG. 28 is an end view of the outer bearing member taken in accordance with sectional line 28-28 in FIG. 27.
Figure 29:
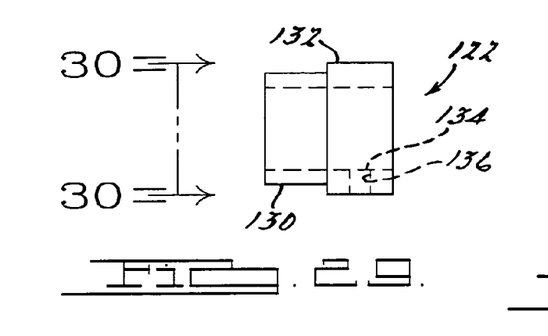
FIG. 29 is side view of the inner bearing member.

Referring now to FIGS. 24-26, the use of a pair of end members 108 can be seen. In FIG. 24, the end members 108 are shown secured to the housing 32. End member 108 essentially forms a support to assist in holding the torque tube 90 and to prevent "bowing" of the torque tube in response to torque applied by the linkage assembly 30. The end member 108 is shown in detail in FIGS. 25 and 26 and includes face portions 110 which each include an opening 112. Dowel pins or other like securing members (not shown) extend through the openings 112 and are used to secure the face portions 110 to the outer surface of the housing 32 perpendicularly to the housing. The end member 108 further includes a bore 114 which extends through the end member. A reduced diameter portion 116 (FIG. 26) of the bore 114 forms an internal circumferential shoulder. Holes 116 are formed on opposite sides of bore 114 and align with openings 102 in the housing 32 shown in FIG. 23. Dowel pins or like elements (not shown) extend through holes 116 and through openings 102 in the housing 32 to help secure the end member to the housing 32.

Figure 30:
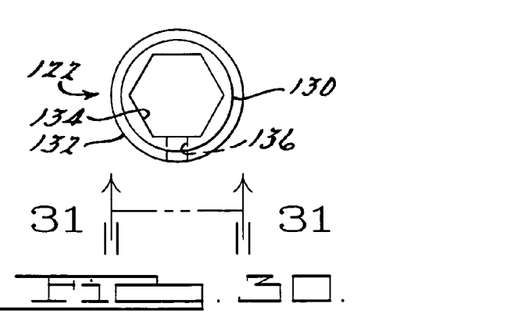
FIG. 30 is an end view of the inner bearing member taken in accordance with directional line 30-30 in FIG. 29.

Referring now to FIGS. 27-30, an outer bearing member 120 (FIGS. 27 and 28) and an inner bearing member 122 (FIGS. 29-31) are shown. The outer bearing member 120 includes a body 124 and a flange 126. Body 124 includes an opening 128 extending therethrough. The inner bearing member 122 (FIGS. 29-31) includes a neck 130 and a body 132. A bore 134 extends through the length of the inner bearing member 122 and a threaded set screw opening 136 opens into the bore 134. Neck 130 fits within the bore 128 of the outer bearing member 120 and the body 132 of the inner bearing member 122 abuts the flange 126 of the outer bearing member 120 as shown in FIG. 24. The bore 134 is further hex-shaped, as seen in FIG. 30. This hex-shaped bore 134 receives the torque tube 90 therethrough and thus provides support, in combination with the end member 108, to prevent bowing of the torque tube.

Figure 2:
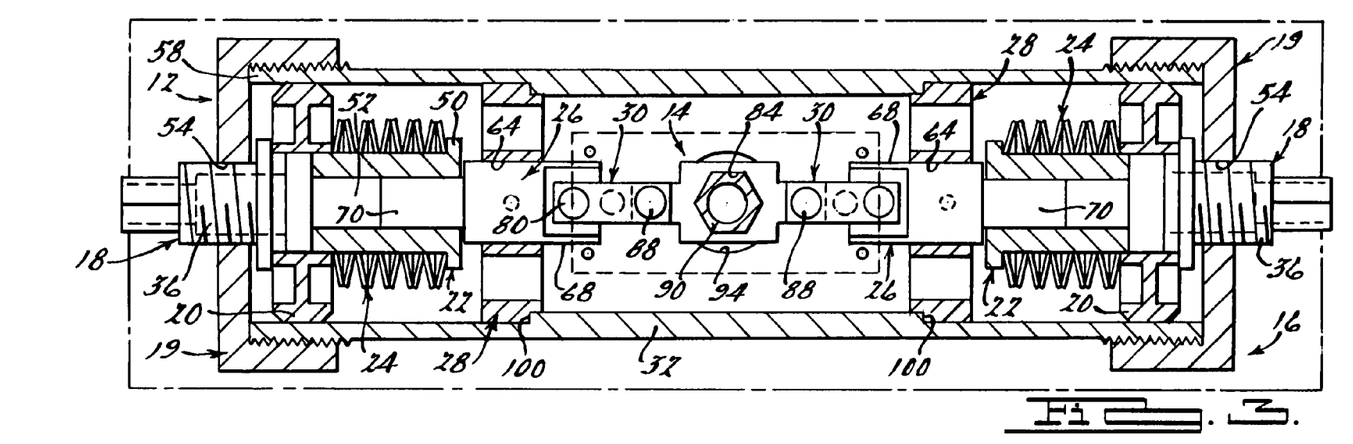
FIG. 2 is a simplified plan view of a portion of a wing showing the apparatus incorporated in the wing.

One preferred implementation of the apparatus 10 is shown in FIG. 2 in simplified form. The torque tube 90 extends within a rotorcraft blade 138 from approximately a root portion 140 of the blade to a tip portion 142 thereof. A suitable supporting structure 144 is disposed within the blade 138 at the tip portion 142 to affix the outermost end 90a of the torque tube 90 to the blade 138. A bearing assembly 146 is disposed within the blade 138 near the root portion 140. The housing 32 is also secured to an interior area 146 of the blade 138. Alternatively, the housing 138 can be secured to spars or other structural elements inside a wing or airfoil. An actuator 148 is mechanically coupled to the torque tube 90 and is used to initiate rotational movement of the torque tube 90. However, due to the significant mechanical energy stored by the biasing assemblies 24, the actuator 148 is able to rotate the torque tube 90 using only a small fraction of the force that would otherwise be required from the actuator 148. Put differently, the apparatus 10 provides the great majority of the mechanical energy (i.e., torque) required to twist the blade 138 due to the negative spring force experienced by the blade 138. In practice, the apparatus 10 essentially "shuttles" energy between the blade 138 and biasing assembly 24. When the blade 138 is in its twisted state, the blade is storing the energy that was previously stored in the apparatus 10. When the actuator 148 returns the torque tube 90 to its initial position (i.e., to de-flex the blade 138), the energy in the blade 138 is transferred back to the apparatus 10. The apparatus 10 thus provides substantially a "zero stiffness" at the root portion 140 of the blade 90 that allows the blade 138 to twist with only a very small force from the external actuator 148.

Figure 3:
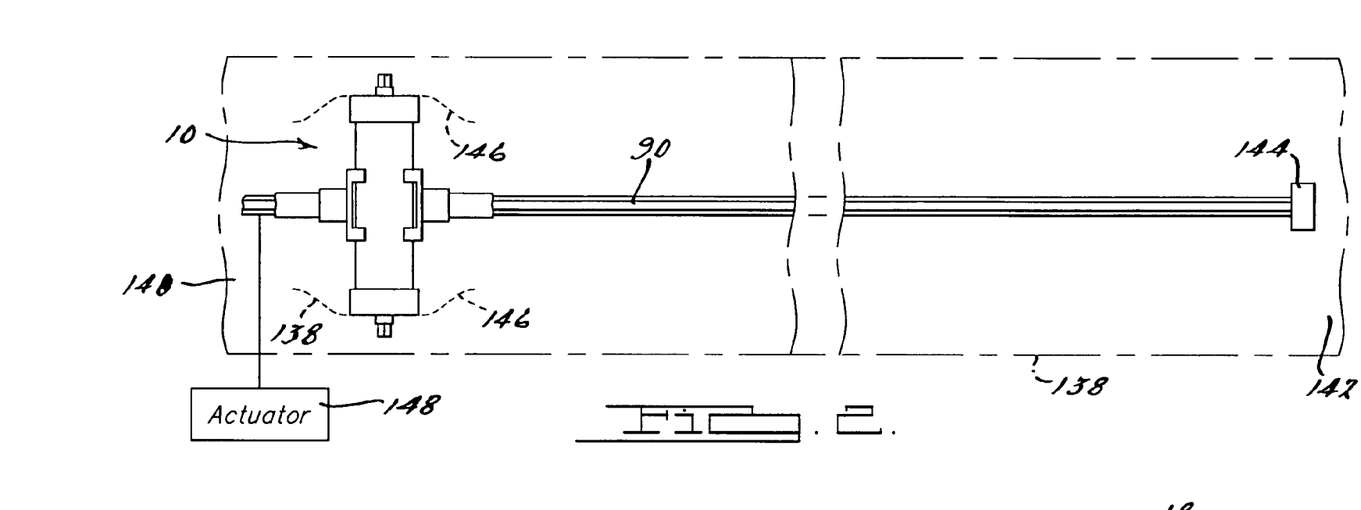
FIG. 3 is a view of the apparatus imparting a torque to a torque tube to twist the wing of FIG. 2.

With further reference to FIG. 1, the apparatus 10 is assembled such that the biasing assemblies 24 are under compression (i.e., preloaded) when the torque tube 90 is in the position shown in FIG. 3. Thus, the linkage assemblies 30 will each have three points of equilibrium, one being represented by the position of the coupling assemblies 30 in FIG. 3, one by the position of the linkage assemblies in FIG. 3, and one where the torque tube 90 has been rotated slightly clockwise from the orientation shown in FIG. 3. The coupling assemblies 30 are thus free to move the torque tube 90 either clockwise or counterclockwise in the drawings of FIGS. 1 and 3, and the position of the linkage assembly 30 in FIG. 1 represents rotation of the torque tube in the counterclockwise direction. Once the actuator 148 (FIG. 2) applies a very small force to the torque tube 90, the biasing force provided by the biasing assemblies 24 immediately assists in rotating the torque tube 90 either clockwise or counterclockwise depending upon the movement of the actuator 148. With the linkage assemblies 30 in the position of equilibrium shown in FIG. 3, only a very small force is required from actuator 148 to hold the torque tube 90 stationary. However, as described above, rotation of the torque tube in either the clockwise or counterclockwise directions (relative to FIGS. 1 and 3) requires only a very small force from the actuator 148. In practice, the reduction of torque required by the actuator 148 can be up to an order of $\frac{1}{1000}$ of the torque that would otherwise be required to twist the blade 138.

Figures 31, 32:
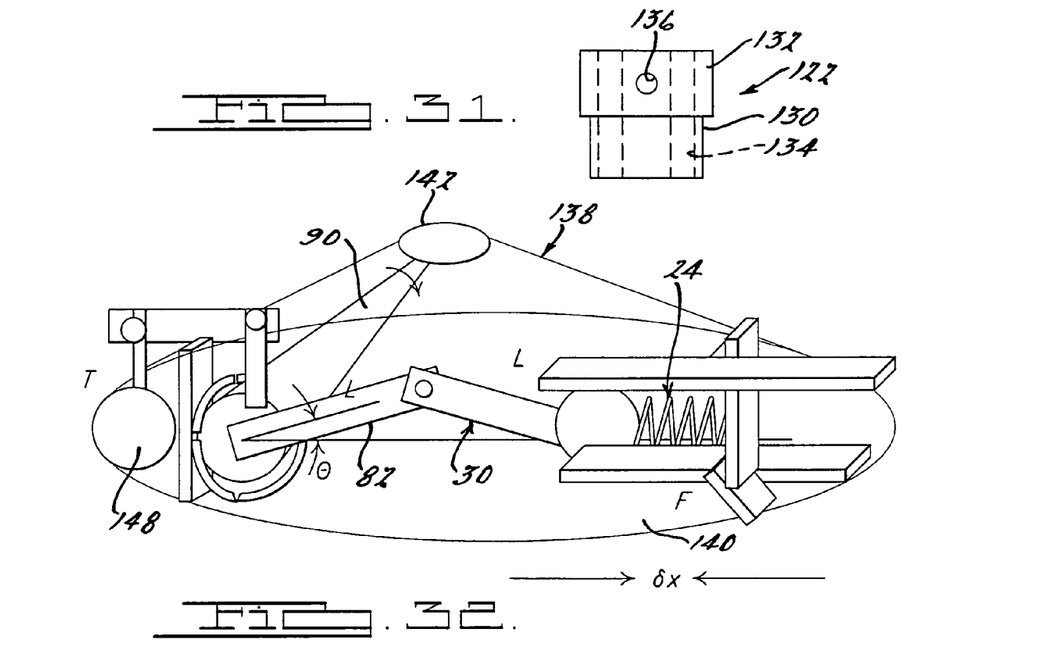
FIG. 31 is a plan view of the inner bearing member taken in accordance with directional line 31-31 in FIG. 30.
FIG. 32 is a simplified diagram of the apparatus of the present invention to aid in understanding the pertinent formulas dealing with the torque generated by the apparatus.
Figure 33:
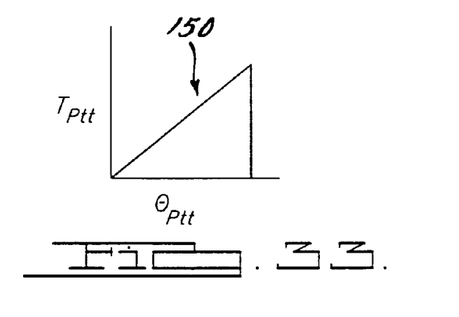
FIG. 33 is a graph of the energy stored in the torque tube in relation to the biasing force of the biasing assembly.
Figure 34:
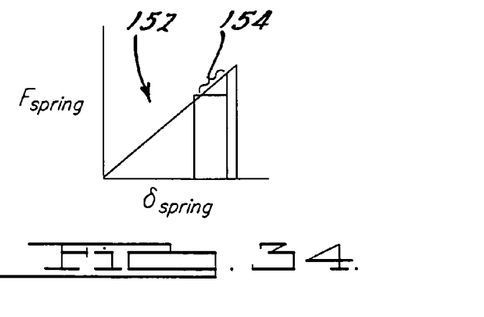
FIG. 34 is a graph of the energy required to return the torque tube to its position of equilibrium.

Referring now to FIGS. 32-34, the force required to move the torque rod 90 and the energy required to return the torque rod to its initial position of equilibrium will be described in connection with several formulas. The torque provided by each linkage assembly 30 to the torque tube 90 can be expressed by the following formula:

$$T_{SES\text{-}to\text{-}Ptt} = 2*L*F_{spring}*\sin(\Theta_{Ptt}) \quad \text{Equation 1:}$$

Where: $T_{SES\text{-}to\text{-}Ptt}$ is the torque applied to the torque tube 90.

The change in length of the biasing assembly (i.e., spring) can be represented by the following formula:

$$\delta_X = 2*L(1-\cos(\Theta_{Ptt})) \quad \text{Equation 2:}$$

The force needed to move the biasing assemblies from one stable position to the other is represented by:

$$\text{Equation 3:} \quad F_{min} = \frac{T_{Ptt\text{-}max}}{2*L*\sin(\Theta_{Ptt\text{-}max})}$$

Referring to FIG. 33, graph 150 illustrates that the energy stored by the torque tube 90 is essentially equal to the energy provided by the baising assemblies 24.

Referring to FIG. 34, the energy required to return the torque tube 90 to its initial position of equilibrium (shown in FIG. 3) is represented by portion 154 of graph 152.

From the foregoing, then, it will be appreciated that the apparatus 10 provides a means for dramatically reducing the force needed by an actuator to twist or bend an air foil, wing, rotorcraft blade or any other object that requires a bending or twisting force to be applied thereto during its operation.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. An apparatus for assisting in moving an element between a first position and a second position, said apparatus comprising:
   a tubular housing;
   a torque transferring member disposed within said tubular housing and having first and second opposing portions, at least one of said first and second portions being fixed secured relative to said element;
   a first biasing member disposed within said tubular housing;
   a first link operably disposed within said tubular housing and coupling said first biasing member with said first portion of said torque transferring member;
   a second biasing member disposed within said tubular housing and arranged axially in line with said first biasing member and said torque transferring member, said first and second biasing members further being arranged on opposing sides of said torque transferring member to cooperate to assist in moving said element rotationally;
   a second link disposed within said tubular housing operably coupling said second biasing member with said second portion of said torque transferring member;
   said first and second biasing members adapted to store sufficient energy to urge said torque transferring member from said first position to said second position when an external force is applied to at least one of said element and said torque transferring member; and
   a tensioning adjuster threadably engaged with said tubular housing at one axial end of said tubular housing, said tensioning adjuster including a portion adapted to be engaged by an external tool and rotated by said external tool, and said tensioning adjuster being operably coupled to said first biasing member to apply a predetermined compressive force to said first biasing member by threaded adjustment of said tensioning adjuster relative to said tubular housing, using said external tool.

2. The apparatus of claim 1, wherein said links are arranged relative to said torque transferring member to create a point of equilibrium at said first position wherein substantially no torque is applied by said biasing members to said torque transferring member.

3. The apparatus of claim 1, wherein at least one of said biasing members comprises a Belleville washer.

4. The apparatus of claim 1, wherein at least one of said biasing members comprises a coil spring.

5. The apparatus of claim 1, wherein each of said links are pivotally supported relative to said torque transferring member.

6. An apparatus for transferring energy to, and receiving energy from, a structure to be deformed, comprising:
   a housing fixedly supported relative to the structure;
   first and second biasing components disposed within said housing and supported axially in line with one another within the housing, and on opposing sides of said structure, said biasing components operating to store energy substantially sufficient to deform said structure from a first orientation into a second orientation;
   a torque member at least partially disposed within said housing and having a first end fixedly secured relative to said structure, and a second end;
   a pair of link assemblies disposed within said housing, and arranged axially in line with said biasing components and operably coupling said biasing components and said second end of said torque member; and
   wherein each said biasing component is preloaded during assembly of the apparatus to store sufficient energy to cooperatively cause said torque member to rotate and urge said structure from said first position into said second position, when an external element initiates movement of said torque member, to cause said stored energy in said biasing components to be transferred to said structure;
   said stored energy imparted to said structure being returned to said biasing components when said structure is urged from said second position back into said first position;
   a first tensioning adjuster threadably engaged with said housing at a first axial end of said housing, said first tensioning adjuster including a portion adapted to be engaged by an external tool and rotated by said external tool, and said first tensioning adjuster being operably coupled to said first biasing member to apply a predetermined compressive force to said first biasing member by threaded adjustment of said first tensioning adjuster relative to said housing, using said external tool; and
   a second tensioning adjuster threadably engaged with said housing at a second axial end of said housing, said second tensioning adjuster including a portion adapted to be engaged by said external tool and rotated by said external tool, and said second tensioning adjuster being operably coupled to said second biasing member to apply a predetermined compressive force to said second biasing member by threaded adjustment of said second tensioning adjuster relative to said housing, using said external tool.

7. The apparatus of claim 6, wherein at least one of said biasing components comprises a Belleville washer.

8. The apparatus of claim 6, wherein said link assemblies are coupled to rotationally opposite positions on said torque member to provide biasing forces that add and operate to apply a torque to said torque member when said structure is moved from said first position into said second position.

9. An apparatus for assisting in moving an element between a first position and a second position, said apparatus comprising:
   a tubular housing having first and second axial ends, said first axial end including a first threaded opening and said second axial end including a second threaded opening, said first and second threaded openings further being arranged generally axially in line with an axial center of said tubular housing;
   a torque transferring assembly disposed within said tubular housing and including a center link fixedly secured relative to said element, a first link pivotally coupled to a first end of said center link and a second link pivotally coupled to a second end of said center link; a first biasing member disposed within said tubular housing adjacent said first axial end;

a first shaft extending within said first biasing member and being pivotally coupled to said first link;

a second biasing member disposed within said tubular housing and arranged axially in line with said first biasing member and said torque transmitting member, said first and second biasing members further being arranged on opposing sides of said torque transferring assembly;

a second shaft extending through said second biasing member and being pivotally coupled to an end of said second link;

said tubular housing further housing the first link, the second link and the center link; and said first and second biasing members adapted to store sufficient energy to cooperatively assist in urging said torque transferring assembly from said first position to said second position when an external force is applied to said element that begins to rotate said element;

a first tensioning adjuster threadably engaged with said first threaded opening at said first axial end of said tubular housing, said first tensioning adjuster including a portion adapted to be engaged by an external tool and rotated by said external tool, and said first tensioning adjuster being operably coupled to said first biasing member to apply a predetermined compressive force to said first biasing member by threaded adjustment of said first tensioning adjuster relative to said tubular housing, using said external tool; and a second tensioning adjuster threadably engaged with said second threaded opening in said second axial end of said tubular housing, said second tensioning adjuster including a portion adapted to be engaged by said external tool and rotated by said external tool, and said second tensioning adjuster being operably coupled to said second biasing member to apply a predetermined compressive force to said second biasing member by threaded adjustment of said second tensioning adjuster relative to said tubular housing, using said external tool.

* * * * *